US010855625B1

(12) United States Patent
Viswanathan et al.

(10) Patent No.: US 10,855,625 B1
(45) Date of Patent: Dec. 1, 2020

(54) INTELLIGENT, ADAPTABLE, AND TRAINABLE BOT THAT ORCHESTRATES AUTOMATION AND WORKFLOWS ACROSS MULTIPLE APPLICATIONS

(71) Applicant: Workato, Inc., Cupertino, CA (US)

(72) Inventors: Gautham Viswanathan, Saratoga, CA (US); Harish Shetty, Sunnyvale, CA (US); Bhaskar Roy, Los Altos, CA (US); Konstantin Tikhonov, San Jose, CA (US); Alexey Pikin, Sunnyvale, CA (US)

(73) Assignee: WORKATO, INC., Cupertino, CA (US)

( * ) Notice: Subject to any disclaimer, the term of this patent is extended or adjusted under 35 U.S.C. 154(b) by 141 days.

(21) Appl. No.: 15/593,247

(22) Filed: May 11, 2017

Related U.S. Application Data

(60) Provisional application No. 62/334,903, filed on May 11, 2016.

(51) Int. Cl.
| | |
|---|---|
| *G06F 15/16* | (2006.01) |
| *H04L 12/58* | (2006.01) |
| *G06F 9/50* | (2006.01) |
| *H04L 29/08* | (2006.01) |
| *G06N 20/00* | (2019.01) |

(52) U.S. Cl.
CPC ............... *H04L 51/02* (2013.01); *G06F 9/50* (2013.01); *G06N 20/00* (2019.01); *H04L 67/10* (2013.01)

(58) Field of Classification Search
CPC ....... H04L 51/02; H04L 67/10; G06N 99/005; G06F 9/50

USPC ......................................................... 709/204
See application file for complete search history.

(56) References Cited

U.S. PATENT DOCUMENTS

| | | | | |
|---|---|---|---|---|
| 6,640,238 | B1 * | 10/2003 | Bowman-Amuah | ... G06F 9/541 709/201 |
| 9,111,219 | B1 * | 8/2015 | Mohla | ...................... G06N 5/02 |
| 9,658,901 | B2 * | 5/2017 | Addala | ................... G06F 9/542 |
| 9,811,394 | B1 * | 11/2017 | Kogias | .................... G06F 9/541 |
| 2003/0028498 | A1 * | 2/2003 | Hayes-Roth | ........... G06N 20/00 706/17 |
| 2004/0199445 | A1 * | 10/2004 | Eder | ...................... G06Q 40/00 705/35 |
| 2012/0266258 | A1 * | 10/2012 | Tuchman | .............. H04L 63/104 726/28 |

(Continued)

*Primary Examiner* — Abdullahi E Salad
(74) *Attorney, Agent, or Firm* — Patent Law Works LLP

(57) ABSTRACT

The present disclosure relates to an intelligent, adaptable, and trainable bot that orchestrates automation, event data integration, and application programming interfaces across multiple applications. The technology may include receiving event data describing events from distributed software applications and processing the event data describing the events to generate notifications, the event data being received based on execution of a software recipe. The bot may transmit the notifications for display to a user using a conversational interface and receive a command from the user via the conversational interface, the command including a requested operation respective to at least one delivered notification. In response to receiving the command, the method may generate recommendations for additional commands respective to the at least one notification based on metadata associated with an event corresponding to the at least one notification.

20 Claims, 10 Drawing Sheets

(56) References Cited

U.S. PATENT DOCUMENTS

| | | | |
|---|---|---|---|
| 2013/0124449 A1* | 5/2013 | Pinckney | G06N 5/048 706/52 |
| 2013/0185081 A1* | 7/2013 | Cheyer | G06F 17/3087 704/275 |
| 2015/0082277 A1* | 3/2015 | Champlin-Scharff | G06F 9/454 717/120 |
| 2015/0163179 A1* | 6/2015 | Maes | G06F 9/546 709/206 |
| 2015/0248226 A1* | 9/2015 | Kumar | G06F 3/04847 715/747 |
| 2016/0063993 A1* | 3/2016 | Dolan | G10L 15/08 704/254 |
| 2016/0085810 A1* | 3/2016 | de Castro Alves | G06F 17/30516 707/752 |
| 2016/0092210 A1* | 3/2016 | Kuchibhotla | G06F 8/71 717/121 |
| 2016/0105308 A1* | 4/2016 | Dutt | G06N 3/0472 709/221 |
| 2016/0112394 A1* | 4/2016 | Sahu | H04L 63/08 726/7 |
| 2016/0124742 A1* | 5/2016 | Rangasamy | H04L 47/70 717/103 |
| 2016/0217391 A1* | 7/2016 | Brigham | G06N 5/022 |
| 2016/0277312 A1* | 9/2016 | Ferris | G06F 9/5072 |
| 2016/0285816 A1* | 9/2016 | Schmid | G06Q 30/0631 |
| 2016/0378450 A1* | 12/2016 | Fu | G06F 8/61 717/177 |
| 2017/0085445 A1* | 3/2017 | Layman | H04L 43/045 |
| 2017/0180499 A1* | 6/2017 | Gelfenbeyn | H04L 51/02 |
| 2017/0316387 A1* | 11/2017 | Joshi | G06Q 10/06316 |
| 2017/0324867 A1* | 11/2017 | Tamblyn | H04M 3/5191 |
| 2017/0324868 A1* | 11/2017 | Tamblyn | H04M 3/5191 |
| 2018/0121828 A1* | 5/2018 | Keysers | G06N 99/005 |
| 2018/0307945 A1* | 10/2018 | Haigh | G06N 20/00 |
| 2018/0357047 A1* | 12/2018 | Brown | G06K 9/00973 |
| 2019/0220774 A1* | 7/2019 | Terry | G06F 16/904 |
| 2019/0324886 A1* | 10/2019 | Champlin-Scharff | G06F 8/30 |

* cited by examiner

INTELLIGENT, ADAPTABLE, AND TRAINABLE BOT THAT ORCHESTRATES AUTOMATION AND WORKFLOWS ACROSS MULTIPLE APPLICATIONS

CROSS-REFERENCE TO RELATED APPLICATIONS

This application claims the benefit under 35 U.S.C. § 119(e) of U.S. Provisional Patent Application No. 62/334,903, entitled "An Intelligent, Adaptable and Trainable Bot That Orchestrates Automation and Workflows Across Multiple Business Applications," and filed May 11, 2016, the entire contents of which are incorporated herein by reference.

BACKGROUND

The present disclosure relates to a customizable platform for integrating, processing, and using data using application programming interface recipes.

With the onset of the Internet economy, numerous (e.g., hundreds, thousands, etc.) companies have developed online platforms providing all types of different functionalities and services to their end users. These third-party applications range from consumer applications, such as social media, photo sharing, money management, messaging, and entertainment platforms, to business and enterprise software as a service (SaaS) offerings, such as customer relationship management (CRM) platforms, enterprise resource planning (ERP) platforms, workplace collaboration platforms, financial and billing platforms, human resource management platforms, analytics platforms, etc.

A software application can access the computing services offered by these third-party applications using application programming interfaces (APIs) exposed by these platforms. In most cases, the APIs are accessible using standardized access protocols (e.g., SOAP, REST, CORBA, ICE, etc.). These APIs include software methods for accessing the various functionalities of the applications, as well as data retrieval methods for accessing information about the APIs, objects, object types, and other aspects of the applications. The APIs generally require users have the requisite permission and authenticate using standard authentication routines (OpenID, OAuth, various proprietary authorization protocols, etc.).

However, integrating (e.g., automating workflow between) these third-party applications (CRM, word processing, storage, versioning, and/or other services) is very complex, time and resource intensive, and ultimately very costly.

More recently, chat applications have been used for business communications; however, there are not currently any solutions that facilitate duplex communication with third-party applications, for instance, using chat applications. Existing solutions require that users move between applications to determine information that they need. Further, some applications provide notifications to users, but there is no efficient way to parse and integrate the notifications over multiple applications. What is needed is a cost-effective, low-maintenance, active, and powerful integration platform that addresses the above-noted deficiencies.

SUMMARY

This disclosure describes technology that addresses the above-noted deficiencies of existing solutions by providing an intelligent, adaptable, and trainable bot that orchestrates automation, event data integration, and application programming interfaces across multiple applications. The technology described herein may customizably provide information that is contextually relevant to a particular user using information from multiple separate applications. This technology may further automate routine tasks, learn about relevant or desired filters and commands, and provide corresponding information to a user based on specific circumstances.

In one innovative aspect, a method for cloning software recipes is disclosed. The method involves receiving, by one or more processors, event data describing one or more events from one or more distributed software applications coupled to the one or more processors by a network, the event data being received based on execution of one or more software recipes, the event data including metadata associated with the one or more events, the one or more software recipes comprising code including a trigger and one or more actions relating to the one or more distributed software applications. The method may process, by the one or more processors, the event data describing the one or more events to generate one or more notifications, transmit, by the one or more processors, the one or more notifications for display to a user using a conversational interface, and receive, by the one or more processors, a command from the user via the conversational interface, the command including a requested operation respective to at least one notification of the one or more notifications. In response to receiving the command from the user, the method may generate, by the one or more processors, recommendations for additional commands respective to the at least one notification based on metadata associated with an event corresponding to the at least one notification, and transmitting, by the one or more processors, the recommendations for additional commands to the user via the conversational interface.

These and other embodiments may each optionally include one or more of the following features, such as: that the recommendations for additional commands utilize data delivered in the one or more notifications; that generating the recommendations for the additional commands includes matching metadata of an event associated with the one or more notifications against available software recipes, the available software recipes including at least one software recipe of the one or more software recipes that is currently active and is associated with the user; that the one or more notifications include an object identifier associated with the one or more events and the metadata describes the object identifier, the object identifier causing the one or more processors to retrieve a corresponding data object describing the one or more events, and that an input into the one or more software recipes includes the object identifier; that generating the recommendations for the additional commands includes ranking possible recommendations based on a defined ranking criterion; that ranking possible recommendations is performed by a machine learning algorithm based on recommendations that have been accepted previously by the user and the defined ranking criterion includes a threshold acceptance rate; that processing the event data describing the one or more events to generate the one or more notifications includes filtering the one or more events based on defined filtering criteria; that the defined filtering criteria are defined based on a notification command customized to the user, the notification command causing the one or more processors to generate a filtered subset of data specific to the user and the one or more events, the filtered subset of data being included in the one or more notifications; and generating suggested filtering criteria based on object identifiers included in the metadata, the object identifiers identifying one or more data objects describing the one or more events.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1:
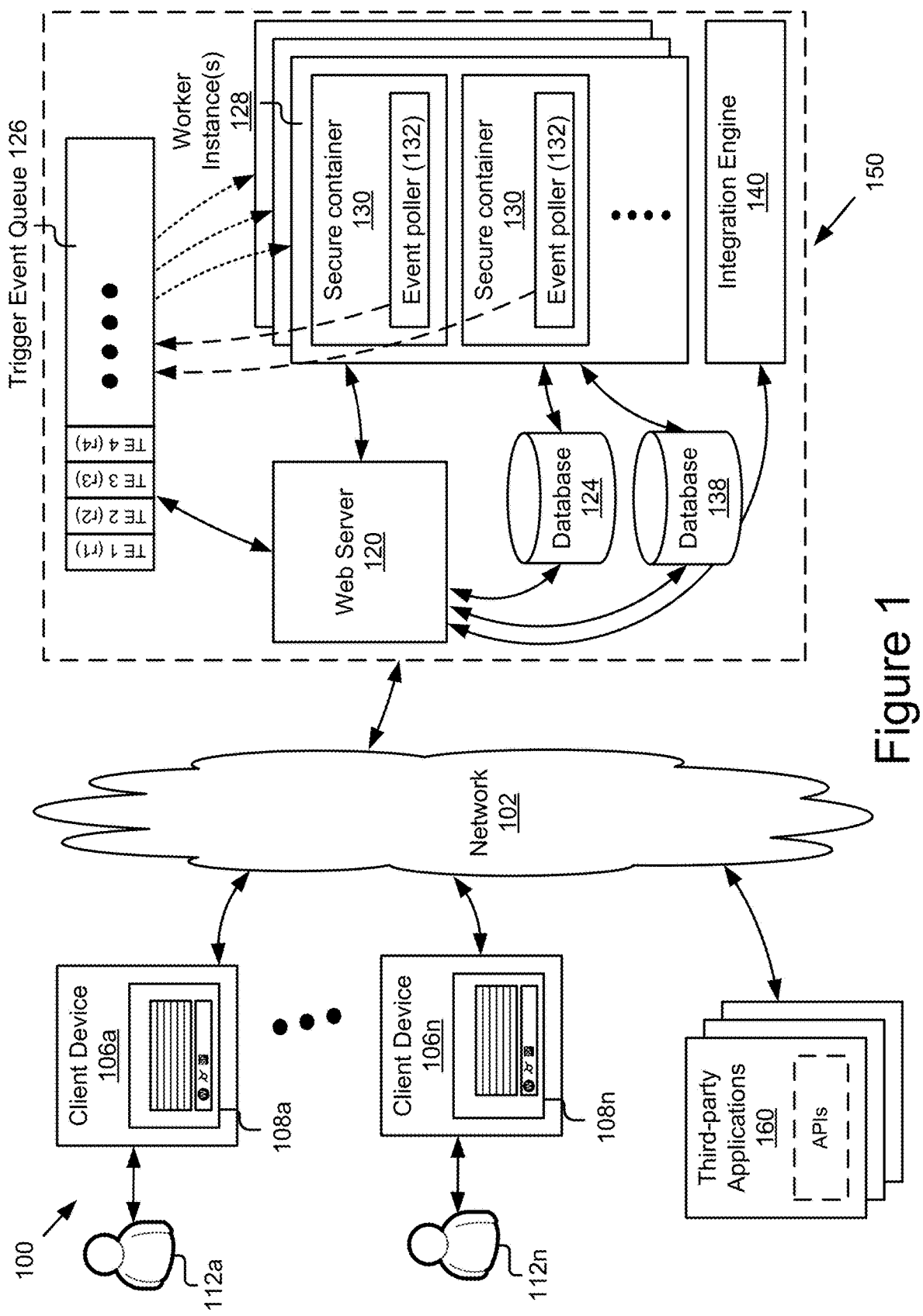
FIG. 1 is a block diagram illustrating an example integration management system encompassed by the technology.

The innovative technology disclosed in this application is capable of, for instance, providing an intelligent, adaptable, and trainable bot that orchestrates automation, event data integration, and application programming interfaces across multiple applications. The technology may include various systems, methods, computer program products, interfaces, and other aspects to provide these and other advantages, acts, and/or functionality.

The technology includes a cloud-based service that automates interaction between different applications (e.g. software or web applications) to facilitate data flow, and integrates data from among the different applications based on customizable criteria. In some implementations, the technology uses one or more multi-step integration processes (also referred to herein as recipes) running on behalf of a user and connecting to distributed applications (e.g., the third-party applications 160 described below) to integrate data describing events from the distributed applications. The recipes may be included on an integration engine 140 along with other components for connecting to and integrating data from distributed applications. A recipe may be an integration flow that includes a trigger and a set of actions, as described in further detail in reference to FIG. 2. The user may interact with an integration engine 140 directly or via another service, such as a chat application or other conversational interface to receive notifications and/or execute commands respective to the distributed applications. A conversational interface allows user to work with multiple distributed applications without having to login multiple times (e.g., to each distributed application) or use multiple user interfaces.

In some implementations, the integration engine 140 may also include a personalization feature for customizing user commands so that issuing the command generates a subset of data specific to the user. In some implementations, the personalization feature provides intelligent command and/or notification recommendations based on event data, past actions of the user, specific active recipes, distributed applications providing event data, metadata, thresholds or conditions defined, for instance, in recipes, etc.

As an illustrative example, the integration engine 140 may provide a direct message to a user via a conversational interface with information pertaining to the user and one or more events. For example, the transmitted information may include notifications pertaining to an event received using a recipe and/or distributed application, as described in further detail elsewhere herein. In some instances, the integration engine 140 may determine additional information pertaining to the event or a data object respective to the event using, for example, data object identifiers or other metadata associated with the event. For example, using a recipe retrieving information from a first distributed application, the integration engine 140 may identify that there has been a change in the status of an account on which the user has been working. The integration engine 140 may determine, either automatically or based on a user command, additional information relating to the account, the change, or other attributes of the event (e.g., the status change of the account), using a recipe retrieving information from one or more second distributed applications. In some implementations, the integration engine 140 may generate suggested commands for the user using metadata specific to the event. In some implementations, the integration engine 140 may automatically filter data about one or more events to create a subset of notifications (or of data within a single notification).

In another example, the integration engine 140 may send a direct message to a user via a conversational interface including a notification that a customer has an overdue invoice, which notification is generated using an interaction of a recipe with an accounting application. The user may issue a command to retrieve information about the overdue invoice to the integration engine 140 via a conversational interface. In response to the command, the integration engine 140 may process the language of the command to retrieve the requested information about the overdue invoice. In some instances, the integration engine 140 may generate suggested additional commands or information pertaining to the customer based on the retrieved information about the overdue invoice. The integration engine 140 may accordingly retrieve the additional information for the customer from one or more distributed applications.

An event may be generated by one or more third-party application(s) 160 connected to the integration engine 140. For example, events may include when a new sales lead is assigned to a user, when there is a change in the status of an account that a particular user is working on or associated with, when a specific (e.g., high priority) customer raises an issue in a support application, when there are new feature updates for a particular business deal that a user is working on, automated daily charts on progress of business statistics, programming errors, or any other data that may be generated by an application connected to the integration engine 140.

FIG. 1 is a block diagram illustrating an example integration management system 100 encompassed by the technology. The illustrated example system 100 includes client devices 106a . . . 106n, a server system 150, and third-party applications 160, which are communicatively coupled via a network 102 for interaction with one another. For example, the client devices 106a . . . 106n may be respectively coupled to the network 102 and may be accessible by users 112a . . . 112n (also referred to individually and collectively as 112). The server system 150 and third-party applications 160 may be communicatively coupled to the network 102. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless networking software and/or hardware that interconnects the computing devices of the system 100. For example, the network 102 may include packet-switching devices that route the data packets to the various computing devices based on information included in a header of the data packets.

The client devices 106a . . . 106n (also referred to individually and collectively as 106) include computing systems having data processing and communication capabilities. In some implementations, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, and/or various physical connection interfaces (e.g., USB, HDMI, etc.), etc. The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing systems.

In the depicted implementation, the client devices 106a . . . 106n respectively contain instances 108a . . . 108n of a client application (also referred to individually and collectively as 108). The client application 108 may be storable in a memory (e.g., see FIG. 2) and executable by a processor (e.g., see FIG. 2) of a client device 106 to provide for user interaction, receive user input, present information to the user via a display (e.g., see FIG. 2), and send data to and receive data from the other entities of the system 100 via the network 102. Examples of various interfaces that can be rendered and presented by the client application 108 are depicted in FIGS. 6A-6E. In some implementations, the client application 108 may present or interact with a chat application or conversational interface operable on a third-party server (not shown) and/or on the server system 150.

In some implementations, the client application 108 may generate and present various user interfaces to perform these acts and/or functionality, such as the example graphical user interfaces discussed elsewhere herein, which may, in some cases, be based at least in part on information received from local storage, the server system 150, and/or one or more of the third-party applications 160 via the network 102. In some implementations, the client application 108 is code operable in a web browser, a native application (e.g., mobile app), a combination of both, etc. Additional structure, acts, and/or functionality of the client devices 106 and the client application 108 are described in further detail elsewhere in this document.

The server system 150, a third-party server (not shown, and/or the third-party applications 160 may include one or more computing systems having data processing, storing, and communication capabilities. For example, these entities 150 and/or 160 may include one or more hardware servers, virtual servers, server arrays, storage devices and/or systems, etc., and/or may be centralized or distributed/cloud-based. In some implementations, these entities 150 and/or 160 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the server system 150 includes a web server 120, a trigger event queue 126, databases 124 and 138, worker instances 128, and an integration engine 140. These components, and their sub-components, are coupled for electronic communication with one another, and/or the other elements of the system 100. In some instances, these components may communicate via direct electronic connections or via a public and and/or private computer network, such as the network 102.

In some embodiments, a worker instance 128 represents a worker compute node and may include more than one secure container 130, as shown in FIG. 1. A container in the worker instance 128, at a given time, may run a recipe. A container may add trigger events to the trigger event queue 126 and (responsive to the trigger event being triggered) receive events from the trigger event queue 126. The event poller 132 is software configured to poll for messages indicating the completion of a prior call so the secure container can proceed to the next step of the recipe (or to completion as the case may be). The server system 150 may utilize any suitable runtime environment and process queue/worker architecture, such as Heroku™.

The web server 120 includes computer logic executable by the processor 204 (see FIG. 2) to process content requests. The web server 120 may include an HTTP server, a REST (representational state transfer) service, or other suitable server type. The web server 120 may receive content requests (e.g., product search requests, HTTP requests, commands, etc.) from client devices 106, cooperate with the other components of the server system 150 (e.g., integration engine 140, worker instances 128, trigger event queue 126, etc.) to determine the content and or trigger processing, retrieve and incorporate data from the databases 124 and 138, format the content, and provide the content to the client devices 106. In some instances, the web server 120 may format the content using a web language and provide the content to a corresponding client application 108 for processing and/or rendering to the user for display. The web server 120 may be coupled to the databases 124 and 138 to store retrieve, and/or manipulate data stored therein.

In some embodiments, the components 108, 120, 128, 126, and/or 140 may include computer logic storable in the memory 206 and executable by the processor 204, and/or implemented in hardware (e.g., ASIC, FPGA, ASSP, SoC, etc.), to provide their acts and/or functionality. For example, with reference also to FIG. 2, in some embodiments, the client application 108, the web server 120, the worker instances 128, the trigger event queue 126, and/or the integration engine 140, and/or their sub-modules are sets of instructions executable by the processor 202 to provide their functionality. In some embodiments, these components and/or their sub-components are stored in the memory 204 of the computing system 200 and are accessible and executable by the processor 202 to provide their functionality. In any of the foregoing embodiments, these components and/or their sub-components may be adapted for cooperation and communication with the processor 202 and other components of the computing system 200.

The databases 124 and 138 are information sources for storing and providing access to data. Examples of the types of data stored by the databases 124 and 128 may include user and partner account information, codes representing the recipes, requirement tables associated with the codes, input and output schemas associated with the codes and/or applications, event data, metadata, objects associated with the applications, codes, and/or schemas, etc., and/or any of the other data discussed herein that is received, processed, stored, or provided by the integration management system 100. Recipes may be associated with a user's account.

The databases 124 and 138 may be included in the computing system 200 or in another computing system and/or storage system distinct from but coupled to or accessible by the computing system 200. The databases 124 and 138 can include one or more non-transitory computer-readable mediums for storing the data. In some implementations, the databases 124 and 138 may be incorporated with the memory 204 or may be distinct therefrom. In some implementations, the databases 124 and 138 may include a database management system (DBMS) operable on the computing system 200. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations.

The third-party applications 160a . . . 160n, as depicted, may respectively expose APIs 162 for accessing the functionality and data of the third-party applications 160a . . . 160n (also referred to individually and collectively as 160). An application 160 may include hardware (e.g., a server) configured to execute software, logic, and/or routines to provide various services (consumer, business, etc.), such as video, music and multimedia hosting, distribution, and sharing; email; social networking; blogging; micro-blogging; photo management; cloud-based data storage and sharing; ERM; CRM; financial services; surveys; marketing; analytics; a combination of one or more of the foregoing services; or any other service where users store, retrieve, collaborate, generate, consume, and/or share information.

In some implementations, the client application 108, the various components of the server system 150, the third-party applications 160, etc., may require users 112 to be registered to access the acts and/or functionality provided by them. For example, to access various acts and/or functionality provided by these components, the components may require a user 112 to authenticate his/her identity (e.g., by confirming a valid electronic address or other information). In some instances, these entities 108, 120, 140, 160, etc., may interact with a federated identity server (not shown) to register/authenticate users 112. Once registered, these entities may require a user 112 seeking access to authenticate by inputting credentials in an associated user interface.

The system 100 illustrated in FIG. 1 is representative of an example system for collaborative design, and it should be understood that a variety of different system environments and configurations are contemplated and are within the scope of the present disclosure. For instance, various functionality may be moved from a server to a client, or vice versa and some implementations may include additional or fewer computing systems, services, and/or networks, and may implement various functionality client or server-side. Further, various entities of the system 100 may be integrated into to a single computing device or system or additional computing devices or systems, etc.

Additional acts, structure, and/or functionality of at least the client devices 106, the server system 150, the third-party applications 160, and their constituent components are described in further detail below.

Figure 2:
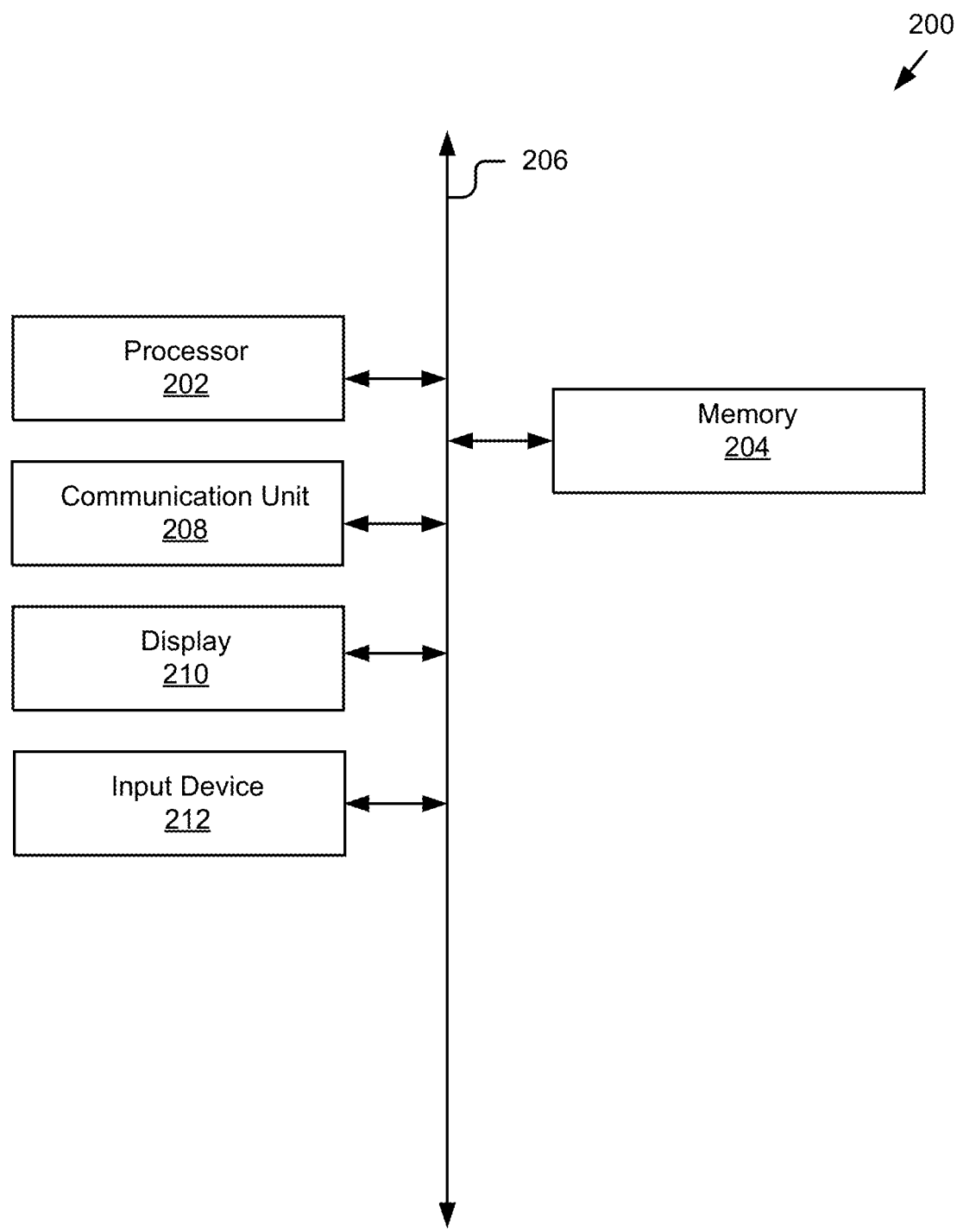
FIG. 2 is a block diagram of an example computing system.

FIG. 2 is a block diagram of an example computing system 200. The example computing system 200 may represent the computer architecture of a client device 106, a server system 150, a server of a conversational interface application 314, and/or a server of the third-party application 160, depending on the implementation. As depicted, the computing system 200 may include a processor 202, a memory 204, a communication unit 208, a display 210, and an input device 212, which may be communicatively coupled by a communications bus 206. The computing system 200 depicted in FIG. 2 is provided by way of example and it should be understood that it may take other forms and include additional or fewer components without departing from the scope of the present disclosure. For instance, various components of the computing devices and may be coupled for communication using a variety of communication protocols and/or technologies including, for instance, communication buses, software communication mechanisms, computer networks, etc.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing system 200 including, for example, the memory 204, the communication unit 208, display 210, and the input device 212.

The memory 204 may store and provide access to data to the other components of the computing system 200. The memory 204 may be included in a single computing device or a plurality of computing devices as discussed elsewhere herein. In some implementations, the memory 204 may store instructions and/or data that may be executed by the processor 202. For example, the memory 204 may include various different combinations of the software components described herein, depending on the configuration. The memory 204 is also capable of storing other instructions and data, including, for example, an operating system, hardware drivers, other software applications, databases, etc. The memory 204 may be coupled to the bus 206 for communication with the processor 202 and the various other components of computing system 200.

The memory 204 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing system or between computing systems, a network bus system including the network 102 and/or portions thereof, a processor mesh, a combination thereof, etc. In some implementations, the various components of the system 100 may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102 and/or other computing systems. For instance, the communication unit 208 may include, but is not limited to, CAT-type interfaces; wireless transceivers for sending and receiving signals using Wi-Fi™, Bluetooth®, IrDA™, Z-Wave™, ZigBee®, cellular communications, and the like, etc.; USB interfaces; various combinations thereof; etc. The communication unit 208 may connect to and send/receive data via a mobile network, a public IP network of the network 102, a private IP network of the network 102 etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The display 210 may display electronic images and data output by the computing system 200 for presentation to a user 112. The display 210 may include any conventional display device, monitor or screen, including, for example, an organic light-emitting diode (OLED) display, a liquid crystal display (LCD), etc. In some implementations, the display 210 may be a touch-screen display capable of receiving input from one or more fingers of a user 112. For example, the display 210 may be a capacitive touch-screen display capable of detecting and interpreting multiple points of contact with the display surface. In some implementations, the computing system 200 may include a graphics adapter (not shown) for rendering and outputting the images and data for presentation on display 210. The graphics adapter (not shown) may be a separate processing device including a separate processor and memory (not shown) or may be integrated with the processor 202 and memory 204.

The input device 212 may include any device for inputting information into the computing system 200. In some implementations, the input device 212 may include one or more peripheral devices. For example, the input device 212 may include a keyboard (e.g., a QWERTY keyboard), a pointing device (e.g., a mouse or touchpad), microphone, an image/video capture device (e.g., camera), etc. In some implementations, the input device 212 may include a touch-screen display capable of receiving input from the one or more fingers of the user. For instance, the structure and/or functionality of the input device 212 and the display 210 may be integrated, and a user of the computing system 200 may interact with the computing system 200 by contacting a surface of the display 210 using one or more fingers. In this example, the user could interact with an emulated (i.e., virtual or soft) keyboard displayed on the touch-screen display 210 by using fingers to contact the display in the keyboard regions.

A recipe is an integration flow that contains a trigger and a set of actions. The trigger causes the actions in a recipe to be executed. Actions are the routines the recipe runs. Each action may include an input configuration and is associated with a given application (e.g., a third-party application 160). Each trigger and action may further include metadata, such as an input schema and an output schema. Actions may run in parallel, series, or various combinations thereof. In some instances, one action may be dependent upon the output of a preceding action. In a typical recipe configuration, the different actions in the recipe are associated with different applications, and the recipe automates the interaction between the different applications using the application programming interfaces (APIs) of those applications. For instance, the recipe may flow, sync, etc., data from one application to another, populate multiple different applications with data from a certain source application, etc. In some embodiments, the recipes are written in Ruby, and the secure containers 130 of the worker instances 128 interpret and process the recipes, although it should be understood that other languages and interpreters may be used.

Figure 3:
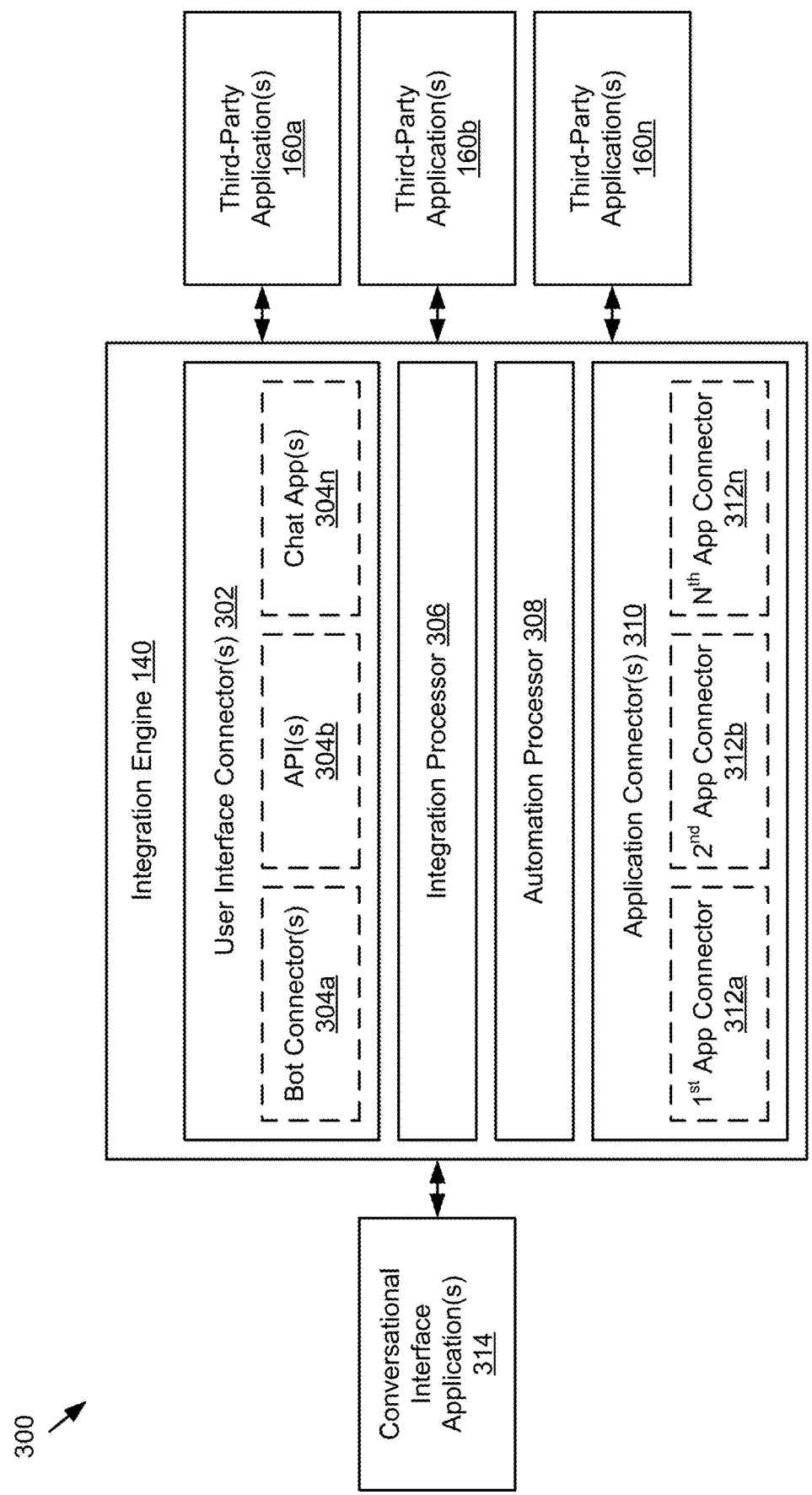
FIG. 3 is a data flow diagram illustrating an example integration engine.

FIG. 3 is a data flow diagram 300 illustrating an example integration engine 140. The integration engine 140 may include an intelligent, adaptable, and trainable bot that orchestrates automation, event data integration, and application programming interfaces across multiple applications. In some implementations, the integration engine 140 may send a message with automatically curated information to a conversational interface application 314 rather than requiring a user to manually find information among many notifications that may be provided by one or more third-party applications 160.

In some implementations, a user may use many (10s, 100s, etc.) third-party applications 160a . . . 160n. Information, events, and corresponding notifications may be scattered across multiple third-party applications 160 making it hard for a user using the conversational interface application 314 to gain a holistic view of information pertaining to an object or event. For example, a sales application (e.g., Salesforce™) may contain information on where customer are in an overall sales process, a support application may contain information about issues customers are facing, an accounting system may contain information about invoices/payments made by customers, etc. In some implementations, the integration engine 140 may intelligently integrate data from the third-party applications 160 and transmit the information in one or more notifications to a user, for example, via a conversational interface application 314. Accordingly, the integration engine 140 may provide appropriate information from multiple sources pertaining to customers, events, or other items to the user, for example, within a single user interface.

In some implementations, the conversational interface application(s) 314 may include a conversational/chat application, such as a first-party application associated with the integration engine 140 or any chat application that supports an application connector 310, such as, Slack™, Hipchat™, FB@Work™, Cisco Spark™, IOS™ or Android™ applications, SMS or MMS messaging, etc., that allow a user to receive and send textual and/or graphical information. In some implementations, the chat application may be extended to support integration-specific commands that trigger and/or receive data from recipes. It should be noted that although the technology described herein refers to using a conversational interface (e.g., via the conversational interface application(s) 314) to communicate with the integration engine 140, other interfaces, such as graphical interfaces or auditory interfaces, are possible and contemplated herein.

The conversational interface application(s) 314 may be operable on the server system 150 or on a third-party server and may be configured to exchange data with the integration engine 140, for example, via the user interface connector(s) 302. The data exchange may be a bi-directional communication between the interface engine 140 and a conversational interface application 314 including sending or receiving alerts, contextual information, summaries or insights about items or events, work automation communication, commands, recipe creation or execution, etc. The data exchange may be performed, for example, upon being requested by a user, upon being received by the integration engine 140, based on a schedule, or based on another criteria or threshold.

The third-party application(s) 160 may include hardware (e.g., a server) configured to execute software, logic, and/or routines to provide various services. For example, the third-party applications 160 may include developer (e.g., GitHub™, Jira™, etc.), sales (e.g., Salesforce™), marketing (e.g., Intercom™, Mailchimp™), customer support (e.g., ServiceNow™), expenses (e.g., Expensify™), accounting (e.g., QBO™, Intacct™, Quickbooks™, etc.), or other applications.

The integration engine 140, and/or one or more of its components, may include computer logic storable in the memory 206 and executable by the processor 204, and/or implemented in hardware to provide its acts and/or functionality. In some implementations, as depicted, the integration engine 140 may include a user interface connector 302, integration processor 306, automation processor 306, and application connector 310.

The user interface connector(s) 302 may include one or more bot connectors 304a, APIs 304b, or chat applications 304n for communicating with a conversational interface or other user interface, such as the conversational interface application(s) 314. The user interface connector(s) 302 may enable bi-directional communication between the integration engine 140 and messaging systems (e.g., 314) that support communication using one or more of the components 304.

In some implementations, the user interface connector(s) 302 may inject personalization data into a conversation context, for instance, to identify a user to other components of the integration engine 140, so that commands can be executed in the user's perspective (e.g., using the user's recipes, applications, customizations, etc., as described herein). For example, the personalization data may enable the integration engine 140 to customize commands to the user, so the user can issue commands, such as, "show me my leads," or "show me John's employment statistics."

The integration processor 306 may include one or more integration processes or bots that mediate data exchange between the conversational interface application(s) 314 (e.g., via the user interface connector(s) 302). In some implementations, the integration processor 306 may analyze conversational language using natural language processing, semantic processing, keyword search, etc., to allow the integration engine 140 to communicate with the user using a conversational interface. In some implementations, the integration processor 306 may include a bot builder to enable a user to build bots or recipes, security modules to restrict information access, or other components.

The automation processor 306 may be configured to build, maintain, and/or execute one or more recipes. The recipes may be run on behalf of a user and connect to the third-party application(s) 160. For example, the recipes may send data to and receive events from the third-party application(s) 160. In some implementations, events can be associated with metadata, for example, by an automated process or by a user having administrative rights for the recipe. Metadata may include identification of any object identifiers that are included in event data, as described in further detail below. The object identifiers may be used, for instance, as a key to retrieve a corresponding data object.

Figure 5:
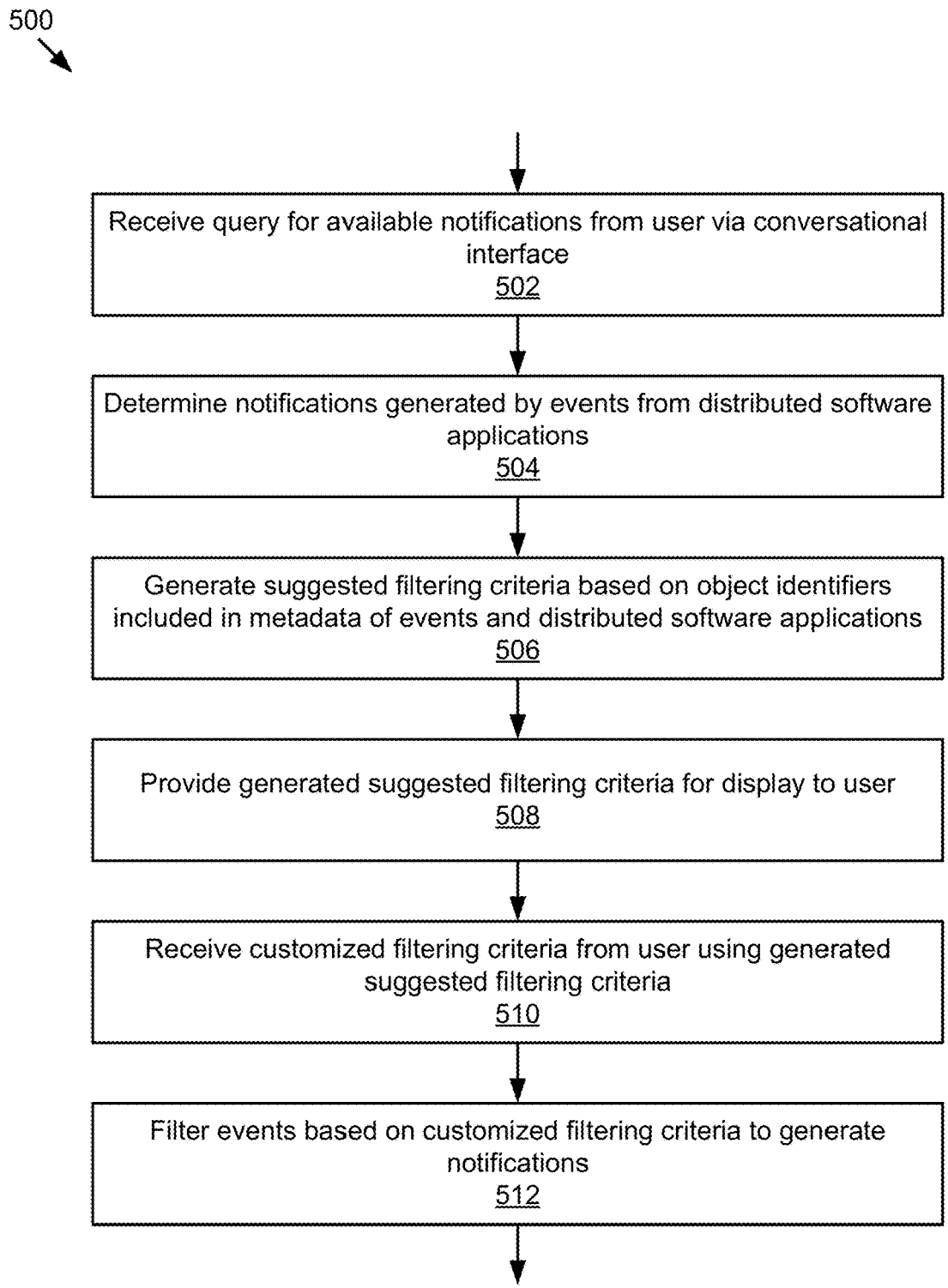
FIG. 5 is a flowchart depicting an example method for customizing event notifications.

In some implementations, the automation processor 306 may be executable to provide smart filtering, rules, and routing to reduce the amount of excess information that may be created by messaging platforms (e.g., the conversational interface application(s) 314) interacting with applications (e.g., the third-party application(s) 160), for example, as described in reference to FIG. 5.

In some implementations, the integration engine 140 may include one or more application connector(s) 310 for communicating with the third-party application(s) 160. The application connector(s) 310 may include multiple application connectors 312a . . . 312n, each of which may be configured to connect a different third-party application 160. In some instances, the application connectors may include application programming interfaces (APIs) or classes of connectors/adapters configured to interact with the APIs of supported third-party applications 160. The connectors connect to the API to retrieve the schema, metadata, data object, data identifiers, etc. The connectors 312 are capable of using standard objects backing the third-party applications 160, as well as custom, user-defined objects defined by users, for example, via the third-party applications 160.

In some implementations, the integration engine 140 may maintain a list that maps objects (e.g., using object identifiers) in one application to objects of other applications. This knowledge mapping of data objects may include corresponding data fields and may be generated based on schemas of the third-party applications 160, pattern matching rules, machine learning, and manual mapping performed by end users, etc. For instance, objects that have the same or similar names may be identified in the knowledge mapping, which sameness can be identified by the integration engine 140 using pattern matching (e.g., text comparison, etc.), for example.

Figure 4:
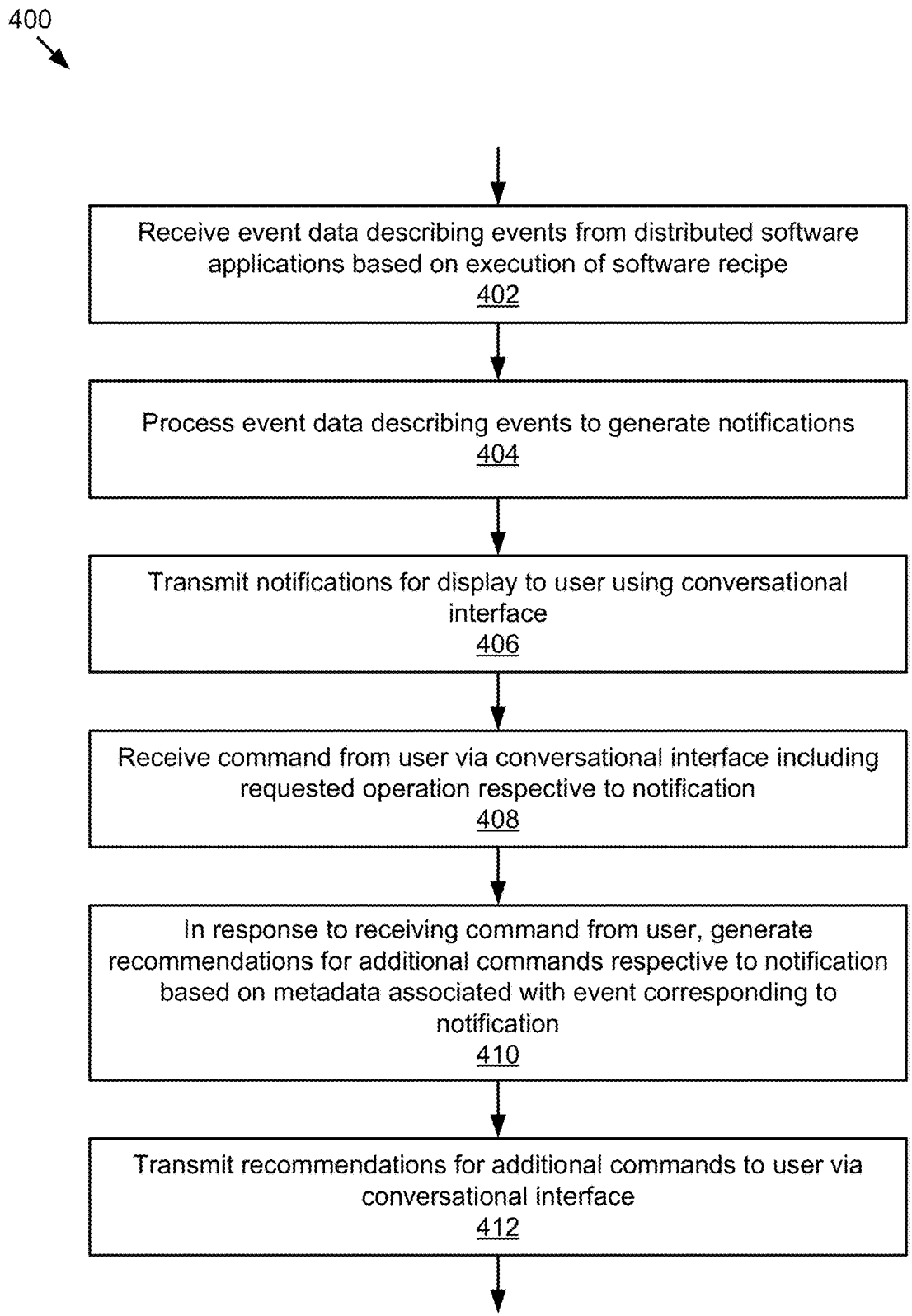
FIG. 4 is a flowchart depicting an example method for integrating event data and generating additional recommended commands specific to the integrated event data.

FIG. 4 is a flowchart depicting an example method 400 for integrating event data and generating additional recommended commands specific to the integrated event data. The method 400 allows the integration engine 140 to pull information on a data object (e.g., of an event) from multiple applications and, in some instances, generate customized suggestions specific to the user and/or the data object. For example, the integration engine 140 may use the method 400 to follow-up on a notification using a suggested command, or in some instances, may follow up on a notification with a composite command.

At 402, the integration engine 140 may receive event data describing one or more events from one or more distributed software applications (e.g., the third-party application(s) 160) communicatively coupled to the integration engine 140. The event data may be retrieved/received based on or using one or more software recipes.

In some implementations, the event data may include metadata associated with the one or more events. For instance, events can be associated with metadata, which association can be recipe specific and defined by a user having administrative rights for the recipe. In some implementations, the metadata may include identification of object identifiers that are included in the event data. In some instances, the object identifier can be used, for example, as a key to retrieve the corresponding data object.

At 404, the integration engine 140 may process event data describing the one or more events to generate one or more notifications. In some implementations, processing the event data may include filtering the one or more events (and/or event data of the one or more events) based on a defined filtering criteria. These and other features are described in further detail elsewhere herein, such as in reference to FIG. 5.

At 406, the integration engine 140 may transmit the one or more notifications for display to the user via the conversational interface. In some implementations, the event data and/or the one or more notifications may include one or more object identifiers associated with the one or more events and the metadata of each respective event may describe the object identifier of that event. The object identifier may be used to cause the integration engine 140 to retrieve a corresponding data object describing the one or more events, from the third-party application(s) 160 or a database of the server system 150, for example. In some implementations, the object identifier may be used as an input into a software recipe, for example, as part of a trigger, action, or schema.

At 408, the integration engine 140 may receive a command from the user via a conversational interface, the command including a requested operation respective to at least one notification of the one or more notifications delivered to the user. In some implementations, the command may include a specialized trigger that, when entered into the conversational interface application 314 triggers an action, for example, using a recipe.

In some implementations, the command may include an action and an indication that the integration engine 140 is being addressed. For instance an indication that the integration engine 140 is being addressed may be "@w" to address the integration engine 140. Example commands may include, "@w help" (for displaying help), "@w show X Application ticket 3124" (to view ticket #3124 from X Application), "@w update X Application ticket {status=closed}" (to close the ticket), "@w create Y Application account for Acme {phone=5551234567}" (to create an account), "@w copy X Application ticket 3124 to Y Application" (to copy a ticket from X Application to Y Application), etc. Other example commands may cause the integration engine 140 to display a user's business leads, opportunities, products, cases, etc.; display details of an opportunity, customer, case, etc.; retrieve a summary of a user's accounts listed by status or in a chart form, create an account, a case, etc. Due to the communication between the conversational interface application(s) 314 and the integration engine 140, the technology may allow a user to interact with multiple applications from a single interface. A graphical interface illustrating these operations is shown, for example, in FIG. 6D.

At 410, in response to receiving command from user, the integration engine 140 may generate recommendations for additional commands. The additional recommended commands may utilize the data already delivered in or with the one or more notifications. For instance, the additional recommended commands may be associated with the at least one notification for which the user provided a command and the recommendation may be based on metadata associated with an event corresponding to the at least one notification.

In some implementations, generating the recommendations for additional commands may include matching metadata of an event associated with the one or more delivered notifications against available software recipes. Available software recipes may include at least one software recipe that is currently active (e.g., currently configured to perform actions in response to triggers) and associated with the user. For example, the metadata for the event may be queried and matched against available recipes for a given user. In some implementations, the inputs to the recipe may be in the form of object identifiers obtainable from the delivered data, which may be used in matching metadata (e.g., using the object identifiers of the one or more notifications and of the recipe). For example, the integration engine 140 may determine that the notifications have associated thereto a first set of object identifiers and may match the first set of object identifiers against object identifiers contained in the available recipes. The integration may use the matched recipes (e.g., the triggers of the matched recipes) to generate the recommended additional commands.

In some implementations, generating the recommendations for the additional commands may include ranking possible recommendations based on a defined ranking criterion. The ranking criterion may be defined by the user, by an administrative user, determined by a computer algorithm, or otherwise defined.

In some implementations, the ranking criterion may include a threshold acceptance rate, which may be determined based on the user's acceptance or use of other similar recommendations in a similar context. For instance, ranking possible recommendations is performed by a machine learning algorithm based on recommendations that have been accepted/used previously by the user. The integration engine 140 may use machine learning algorithms, such as a supervised machine learning algorithm that is trained on recommendations, contexts of those recommendations, and the user's (or another user's) response to those recommendations. The integration engine 140 may use one or more models generated by the machine learning algorithm to determine a projected acceptance rate. In some implementations, the integration engine 140 may score the similarity between a potential recommendation (and/or its context) and one or more models generated by the machine learning algorithm to determine a confidence score. The confidence score may be used along with the projected acceptance rate and a defined threshold acceptance rate (e.g., with a threshold confidence component) to generate the recommendations.

In some implementations, the integration engine 140 may transmit the recommendations for additional commands to the user via the conversational interface. If the user uses a recommended command, the integration engine 140 may use information already received for the one or more events to perform the operation requested by the command, or may further interact with one or multiple of the third-party applications 160 to perform the operation requested by the command. In some instances, the integration engine 140 may use the user's interaction (whether affirmative, negative, or ignore) with the recommended command to update the machine learning models described above.

FIG. 5 is a flowchart depicting an example method 500 for customizing event notifications. In some implementations, the operations of the method 500 may be used, for example, at 404 of the method 400 disclosed in reference to FIG. 4. The integration engine 140 may use the operations of the method 500 to reduce excess notifications, for instance, based on thresholds or conditions defined in recipes.

At 502, the integration engine 140 may receive a query for available notifications from a user via a conversational interface (e.g., using the conversational interface application(s) 314). It should be noted that although the user may initiate transmitting the query, in some implementations, the integration engine 140 may automatically determine and provide event notifications (which may be filtered or un-filtered, depending on the implementation).

At 504, the integration engine 140 may determine notifications generated by events from distributed software applications, for instance, based on receiving the query for available notifications. In some implementations, the integration engine 140 may use one or more recipes associated with the query (e.g., in the form of a trigger) to generate the notifications. In some implementations, the integration engine 140 may determine additional contextual data relevant to the query, user, or events, etc., for example, using object identifiers.

At 506, the integration engine 140 may generate suggested filtering criteria based on object identifiers included in the metadata of events and in distributed software applications (e.g., the third-party application(s) 160). As described above, the object identifiers may identify one or more objects describing or described by the events and may, in some implementations, be customized by a user, administrator, or third-party application. The suggested filtering criteria may be based on information about object identifiers that are part of the event data and obtained from the event metadata. For example, using the event metadata, the integration engine 140 may determine which object identifiers are included in the event data and generate suggested filtering criteria based on the object identifiers available for the events. In some implementations, the integration engine 140 may train a machine learning model based on interaction by the user or other users with recommendations presented in a similar context, such as for similar events. For example, those filtering criteria that are determined to be preferred by users based on the training data (e.g., past interactions by users with notifications and events) may be used to present or rank the suggested filtering criteria.

The integration engine 140 may use filtering criteria to provide smarter, more exception driven notifications. The filtering criteria may include the relevance or importance of event data or notifications. For instance, the relevance or importance may be determined based on field values (e.g., ticket, event, notification priority, attributes, etc.), intelligent filtering using notification attributes, or based on satisfaction of thresholds (e.g., for priority, quantity, or relevance, etc.). For instance, rather than issuing a notification for each time a customer signs up for a meeting associated with the user (e.g., an event), the integration engine 140 may generate a notification once per day or upon a set number of customers signing up (e.g., a summary notification may state: "25 customers signed up for your meeting and 111 customers have signed up to date").

At 508, the integration engine 140 may provide the generated suggested filtering criteria for display to the user and, at 510, the integration engine 140 may receive customized filtering criteria from the user using the suggested filtering criteria. In some implementations, the integration engine 140 may provide the suggested filtering criteria in a notification with a graphical element that the user may select or with which the user may otherwise interact (e.g., conversationally using written or spoken words).

The selected filtering criteria may be set as a global setting, a setting for the same or similar events, or may be associated with the command provided by the user. This operation allows customization of chat commands by the end user so that issuing the command generates a filtered subset of data specific to that user. Accordingly, in some implementations, the defined filtering criteria may be defined based on a notification/chat command customized to the user, so that the command may cause the integration engine 140 to generate a filtered subset of data specific to the user and the one or more events. For example, the filtered subset may be provided in one or more notifications.

At 512, the integration engine 140 may filter events, event data, or notifications based on the customized filtering criteria. In some implementations, once the filtering criteria have been selected by the user, the integration processor 306 may apply the filtering criteria, for example, on a per-user basis as application events are received, so that matching events generate user-visible notifications.

Figure 6A:
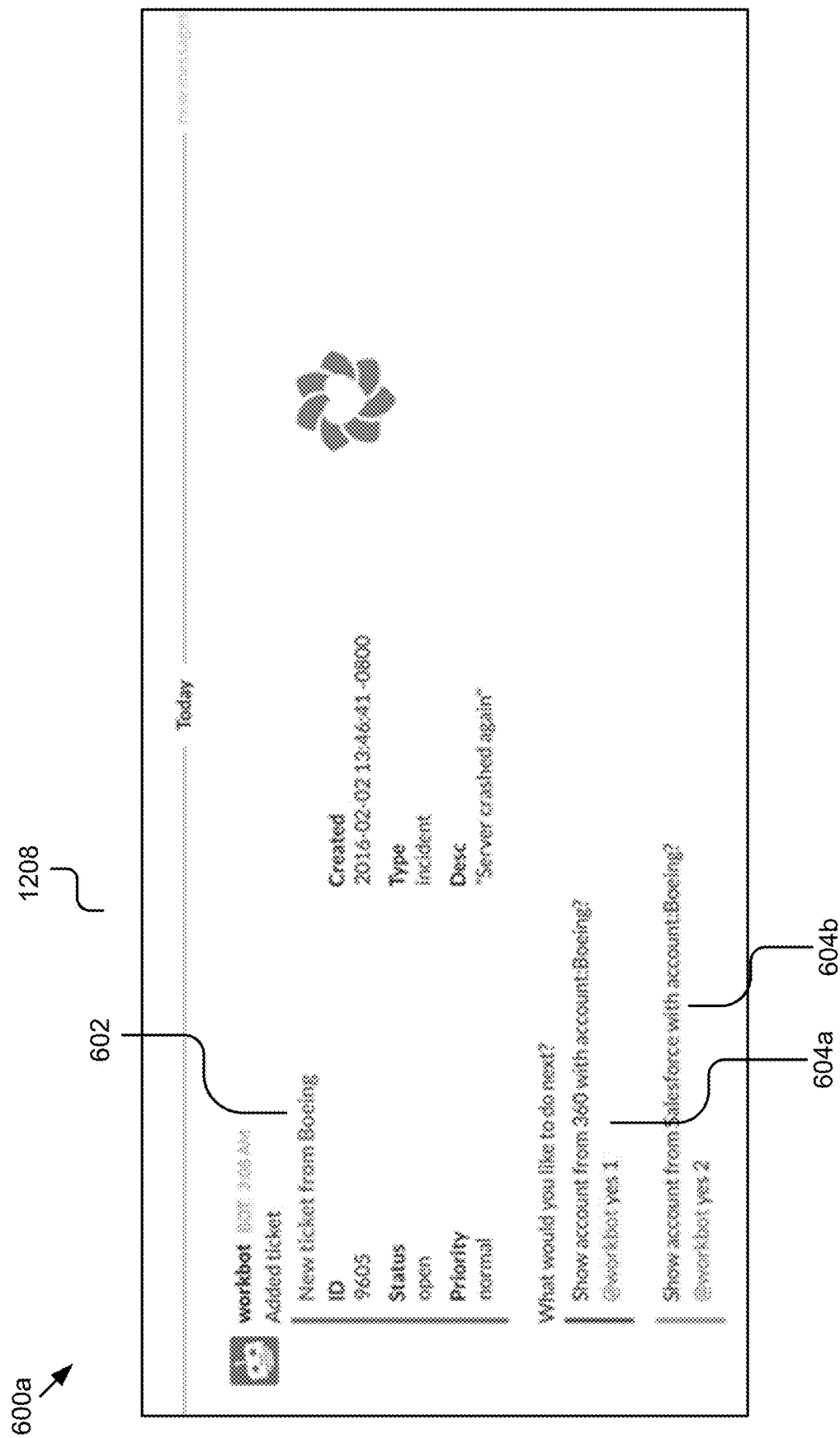
FIGS. 6A-6E are graphical representations illustrating example graphical user interfaces for interacting with an integration engine.

FIG. 6A is a graphical representation of an example graphical user interface 600a for interacting with the integration engine 140. The user interface 600a is illustrated as a conversational interface. The user interface 600a includes personalized application alerts/notifications 602 and associated prompts 604a and 604b for receiving commands associated with the notifications 602. The associated prompts 604a and 604b may include context based suggestions (e.g., illustrated as "Show account from Salesforce with account: Boeing?").

Figure 6B:
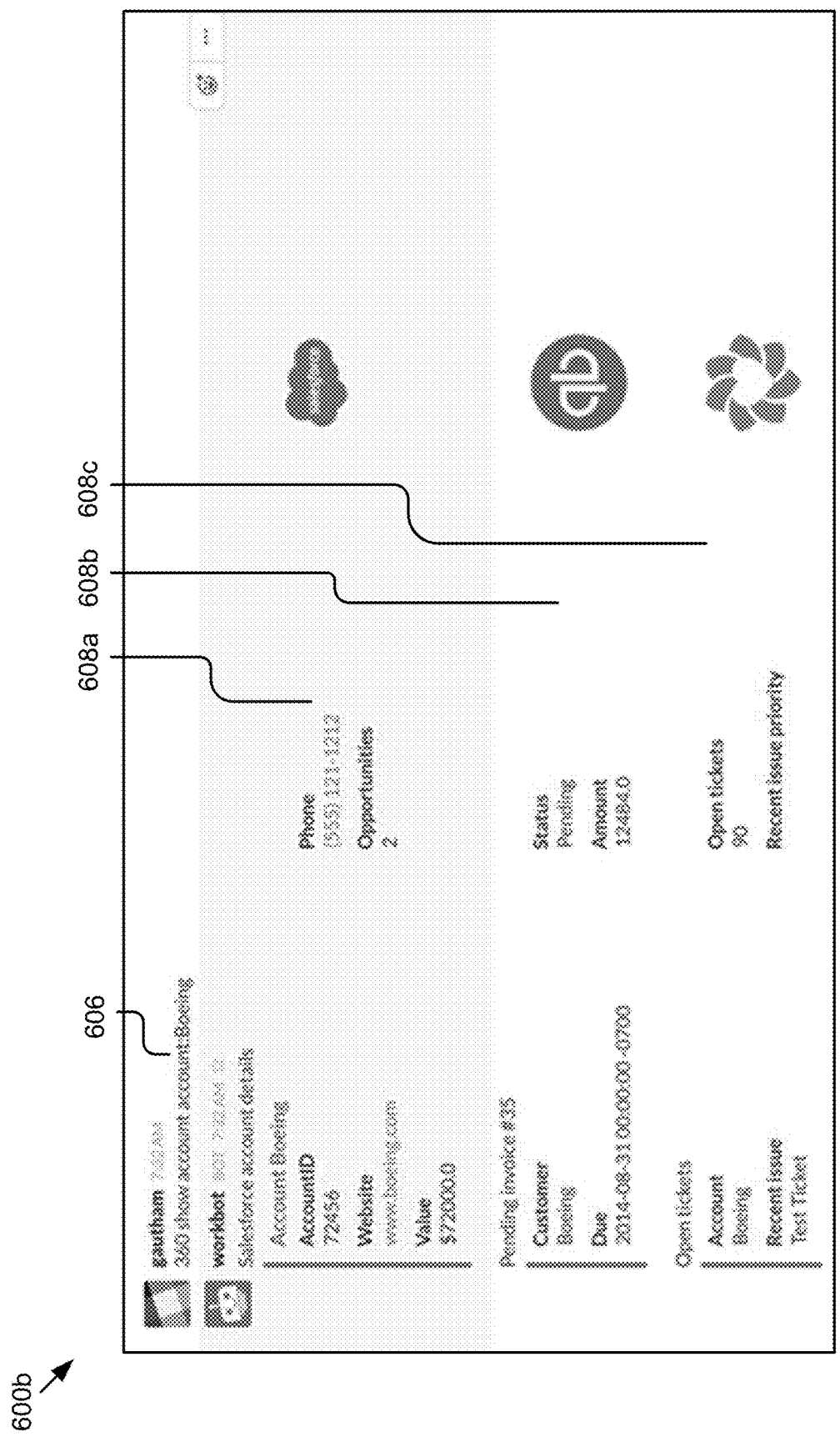

FIG. 6B is a graphical representation of an example graphical user interface 600b for interacting with the integration engine 140. The user interface 600b is illustrated as a conversational interface. The user interface 600b illustrates a command 606 transmitted to the integration engine 140 requesting contextual information for a particular data object. As illustrated, in response to the command, the integration engine 140 provides contextual information for the particular data object, for example, the integration engine 140 provides data received/retrieved from a plurality of connected third-party applications 160 in graphical elements 608a, 608b, and 608c to provide a more complete view of the data object (e.g., a customer account) using, for instance, a command issued by the user.

Figure 6C:
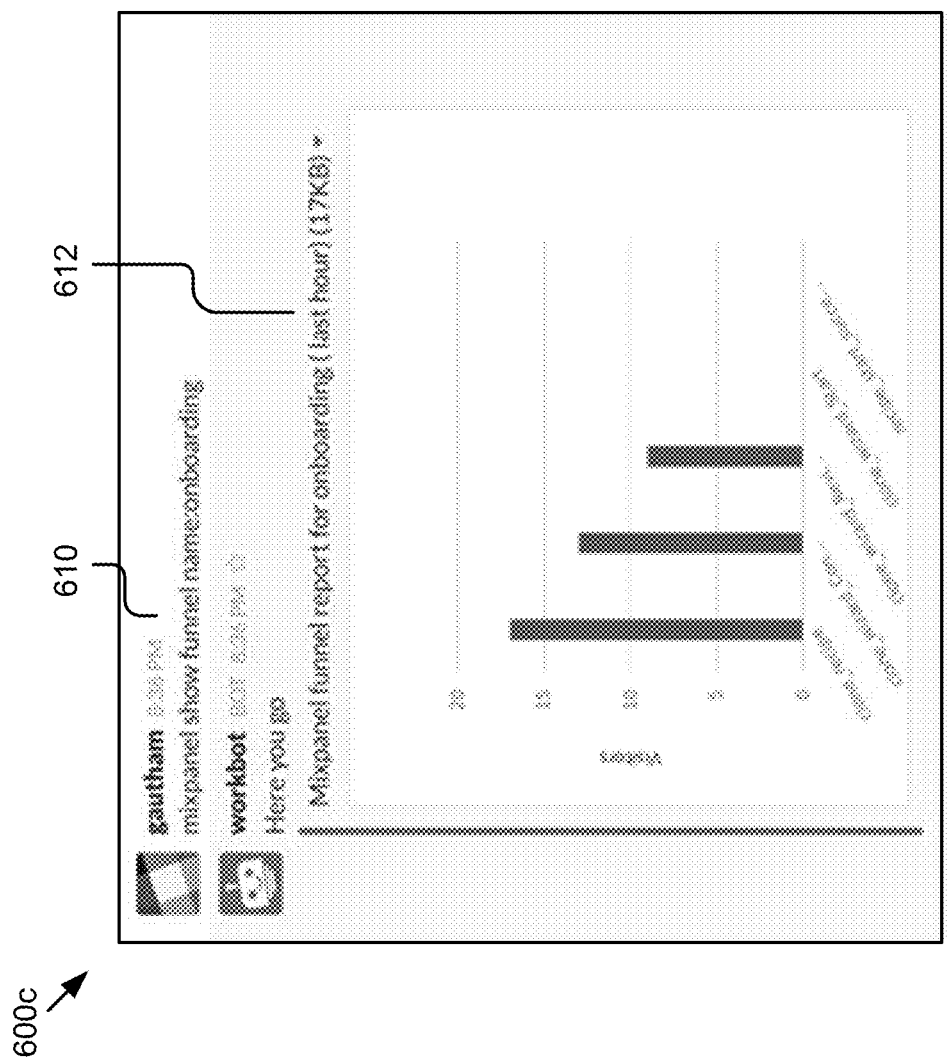

FIG. 6C is a graphical representation of an example graphical user interface 600c for interacting with the integration engine 140. The user interface 600c is illustrated as a conversational interface. The user interface 600c illustrates a command 610 transmitted to the integration engine 140 requesting contextual information for a particular data object. As illustrated, in response to the command, the integration engine 140 may provide a generated report 612 (e.g., in the form of a chart, graph, or textual data) based on the event data of one or more events. For example, recipes or bots can be used to generate powerful insights based on filtered and contextual event data.

Figure 6D:
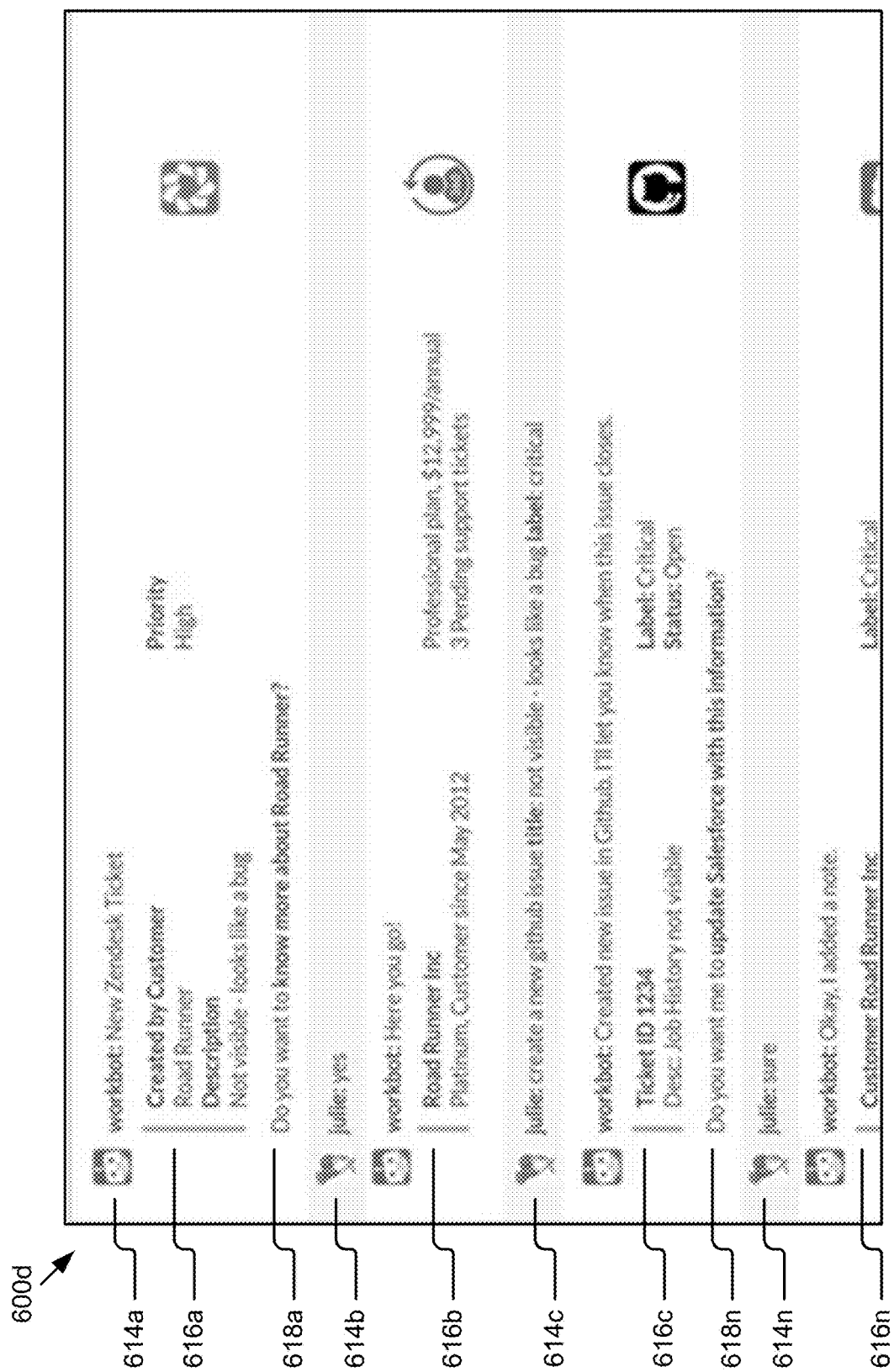

FIG. 6D is a graphical representation of an example graphical user interface 600d for interacting with the integration engine 140. The user interface 600d is illustrated as a conversational interface. The user interface 600d illustrates a series of commands 614 sent by the user to the integration engine 140 (e.g., illustrated as "workbot"). The integration engine 140 may use the commands 614a . . . 614n to send data to and/or receive data from multiple different third-party applications 160 and provide notifications 616a . . . 616n to the user respective to the operations associated with the commands. In some implementations, the integration engine 140 provides suggested commands 618a . . . 618n respective to the issued notifications. For instance, as illustrated, the integration engine 140 may generate and provide a suggested command 618a respective to the notification 616a and a suggested command 618n respective to the notification 616c. In some implementations, the integration engine 140 may be configured understand that conversational commands may refer to previous commands, operations, or notifications, for example, "sure" in 614n refers to the suggested command 618n.

Figure 6E:
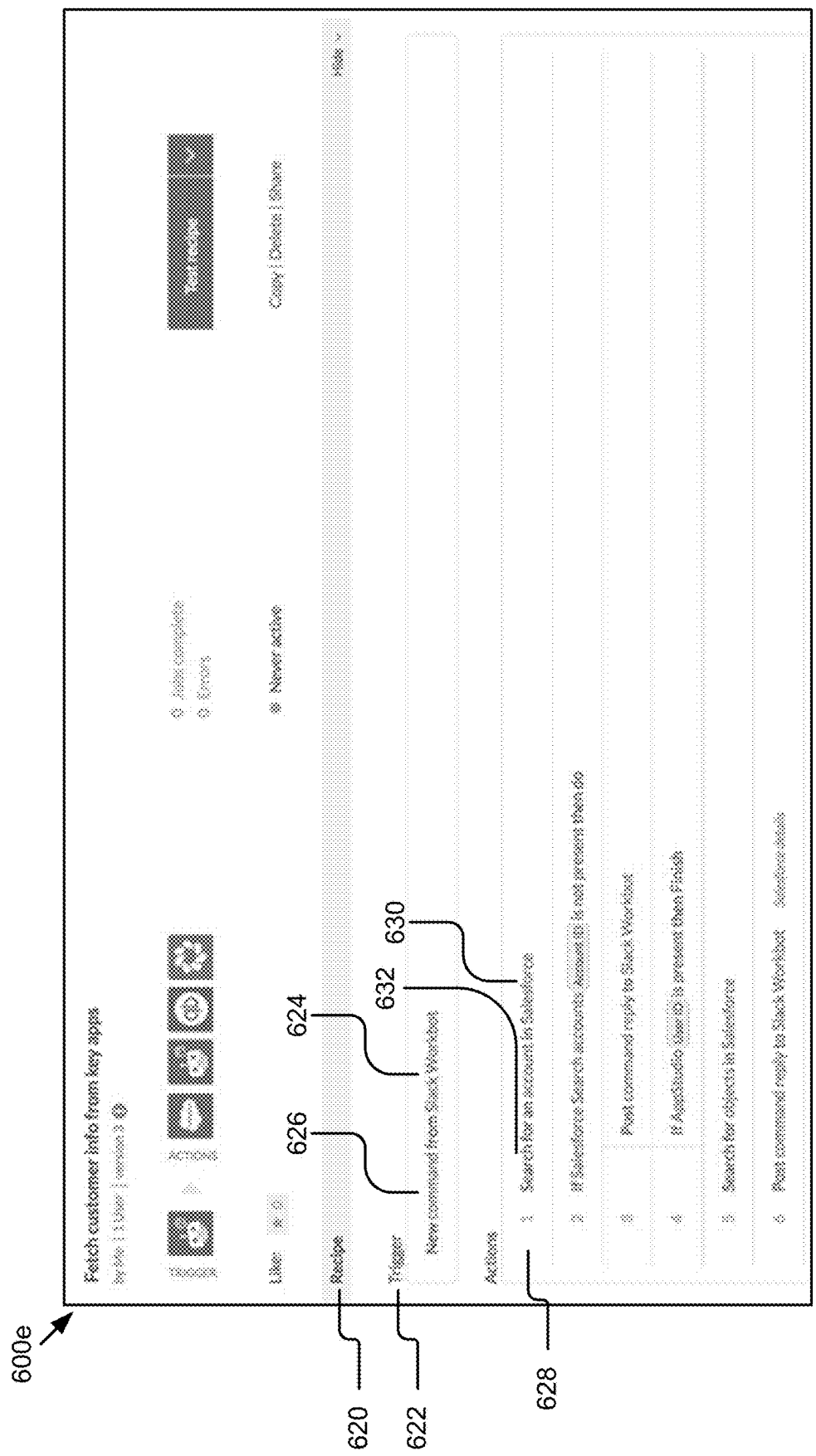

FIG. 6E is a graphical representation of an example graphical user interface 600e for interacting with the integration engine 140. As illustrated, the graphical user interface 600e may include elements for defining a software recipe including a trigger and a set of actions. The graphical user interface 600e includes a recipe region 620, the recipe region 620 includes a trigger section 622 for configuring the parameters of the trigger. For example, the trigger section 622 may include an application definition element 624 and a trigger definition element 626. The application definition element 624 is user selectable to define which application activates the trigger. The trigger action may be any event that can occur within the application defined using the application definition element 624. For instance, the trigger action may be that an object was created within the Salesforce™ application.

The interface 600e also includes one or more action sections 628 for configuring the various actions of the recipe. The action section 628 may include an application definition element 630 and action definition element 632. The action sections 628 may also include further regions for defining additional parameters, data fields, etc., of actions. The action defined by the action definition element 632 may be any action that can be executed using the application defined via the application definition element 630.

While certain acts and/or functionality described herein as being associated with certain modules, it should be understood that these acts and/or functionality may be performed by other modules, or a combination of two or more modules, and/or moved from a client side or server side implementation without departing from the scope of this disclosure. Additionally, it should be understood that the system illustrated herein is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system depicted herein provides an example of an applicable computing architecture, it should be understood that any suitable computing architecture, whether local, distributed, or both, may be utilized in the system.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 202.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a collection of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for automated event data integration, comprising:

receiving, by one or more processors, event data describing one or more events from one or more distributed software applications coupled to the one or more processors by a network, the event data being received based on execution of one or more software recipes, the event data including metadata associated with the one or more events, the one or more software recipes comprising code including a trigger and one or more actions relating to the one or more distributed software applications;

processing, by the one or more processors, the event data describing the one or more events to generate one or more notifications;

transmitting, by the one or more processors, the one or more notifications for display to a user using a conversational interface;

receiving, by the one or more processors, a command from the user via the conversational interface, the command including a requested operation respective to at least one notification of the one or more notifications;

in response to receiving the command from the user, generating, by the one or more processors, recommendations for additional commands respective to the at least one notification based on the received command and metadata associated with an event corresponding to the at least one notification, the metadata associated with the one or more events received in the event data including the metadata associated with the event upon which the recommendations for additional commands are generated; and transmitting, by the one or more processors, the recommendations for additional commands to the user via the conversational interface.

2. The computer-implemented method of claim 1, wherein the recommendations for additional commands utilize data delivered in the one or more notifications.

3. The computer-implemented method of claim 1, wherein generating the recommendations for the additional commands includes matching metadata of an event associated with the one or more notifications against available software recipes, the available software recipes including at least one software recipe of the one or more software recipes that is currently active and is associated with the user.

4. The computer-implemented method of claim 1, wherein
the one or more notifications include an object identifier associated with the one or more events and the metadata describes the object identifier, the object identifier causing the one or more processors to retrieve a corresponding data object describing the one or more events, and
an input into the one or more software recipes includes the object identifier.

5. The computer-implemented method of claim 1, wherein generating the recommendations for the additional commands includes ranking recommendations based on a defined ranking criterion.

6. The computer-implemented method of claim 5, wherein ranking recommendations is performed by a machine learning algorithm based on recommendations that have been accepted previously by the user and the defined ranking criterion includes a threshold acceptance rate.

7. The computer-implemented method of claim 1, wherein processing the event data describing the one or more events to generate the one or more notifications includes filtering the one or more events based on defined filtering criteria.

8. The computer-implemented method of claim 7, wherein the defined filtering criteria are defined based on a notification command customized to the user, the notification command causing the one or more processors to generate a filtered subset of data specific to the user and the one or more events, the filtered subset of data being included in the one or more notifications.

9. The computer-implemented method of claim 7, further comprising generating suggested filtering criteria based on object identifiers included in the metadata, the object identifiers identifying one or more data objects describing the one or more events.

10. A system comprising:
one or more processors; and
a non-transitory memory storing instructions that, when executed by the one or more processors, cause the one or more processors to:
receive event data describing one or more events from one or more distributed software applications coupled to the one or more processors by a network, the event data being received based on execution of one or more software recipes, the event data including metadata associated with the one or more events, the one or more software recipes comprising code including a trigger and one or more actions relating to the one or more distributed software applications;
process the event data describing the one or more events to generate one or more notifications;
transmit the one or more notifications for display to a user using a conversational interface;
receive a command from the user via the conversational interface, the command including a requested operation respective to at least one notification of the one or more notifications;
in response to receiving the command from the user, generate recommendations for additional commands respective to the at least one notification based on the received command and metadata associated with an event corresponding to the at least one notification, the metadata associated with the one or more events received in the event data including the metadata associated with the event upon which the recommendations for additional commands are generated; and
transmit the recommendations for additional commands to the user via the conversational interface.

11. The system of claim 10, wherein the recommendations for additional commands utilize data delivered in the one or more notifications.

12. The system of claim 10, wherein generating the recommendations for the additional commands includes matching metadata of an event associated with the one or more notifications against available software recipes, the available software recipes including at least one software recipe of the one or more software recipes that is currently active and is associated with the user.

13. The system of claim 10, wherein
the one or more notifications include an object identifier associated with the one or more events and the metadata describes the object identifier, the object identifier causing the system to retrieve a corresponding data object describing the one or more events, and
an input into the one or more software recipes includes the object identifier.

14. The system of claim 10, wherein generating the recommendations for the additional commands includes ranking possible recommendations based on a defined ranking criterion.

15. The system of claim 14, wherein ranking possible recommendations is performed by a machine learning algorithm based on recommendations that have been accepted previously by the user and the defined ranking criterion includes a threshold acceptance rate.

16. The system of claim 10, wherein processing the event data describing the one or more events to generate the one or more notifications includes filtering the one or more events based on defined filtering criteria.

17. The system of claim 16, wherein the defined filtering criteria are defined based on a notification command customized to the user, the notification command causing the one or more processors to generate a filtered subset of data specific to the user and the one or more events, the filtered subset of data being included in the one or more notifications.

18. The system of claim 16, wherein the instructions further cause the one or more processors to generate suggested filtering criteria based on object identifiers included in the metadata, the object identifiers identifying one or more data objects describing the one or more events.

19. A method, comprising:

receiving, by one or more processors, event data describing one or more events from one or more distributed software applications coupled to the one or more processors by a network, the event data being received based on execution of one or more software recipes, the event data including metadata associated with the one or more events, the one or more software recipes comprising code including a trigger and one or more actions relating to the one or more distributed software applications;

filtering, by the one or more processors, the event data of the one or more events to generate one or more notifications based on defined filtering criteria specific to a user;

transmitting, by the one or more processors, the one or more notifications for display to the user using a conversational interface;

receiving, by the one or more processors, a command from the user via the conversational interface, the command including a requested operation respective to at least one notification of the one or more notifications;

in response to receiving the command from the user, generating, by the one or more processors, recommendations for additional commands respective to the at least one notification based on the received command and metadata associated with an event corresponding to the at least one notification, the recommendations for additional commands using data delivered in the one or more notifications, the metadata associated with the one or more events received in the event data including the metadata associated with the event upon which the recommendations for additional commands are generated; and transmitting, by the one or more processors, the recommendations for additional commands to the user via the conversational interface.

20. The method of claim 19, wherein the defined filtering criteria are defined based on a notification command customized to the user, the notification command causing the one or more processors to generate a filtered subset of data specific to the user and the one or more events, the filtered subset of data being included in the one or more notifications.

* * * * *